(12) United States Patent
Rasmussen

(10) Patent No.: US 10,443,622 B2
(45) Date of Patent: Oct. 15, 2019

(54) ACTIVE CORE COOLING SYSTEM

(71) Applicant: UNITED TECHNOLOGIES CORPORATION, Farmington, CT (US)

(72) Inventor: Barry S. Rasmussen, E. Hampton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 601 days.

(21) Appl. No.: 15/180,729

(22) Filed: Jun. 13, 2016

(65) Prior Publication Data
US 2017/0356457 A1    Dec. 14, 2017

(51) Int. Cl.
| | |
|---|---|
| *F04D 29/58* | (2006.01) |
| *F01D 25/14* | (2006.01) |
| *F02C 7/18* | (2006.01) |
| *F04D 27/00* | (2006.01) |
| *B64D 13/08* | (2006.01) |
| *F04D 29/32* | (2006.01) |
| *F04D 29/52* | (2006.01) |

(Continued)

(52) U.S. Cl.
CPC .......... *F04D 29/582* (2013.01); *B64D 13/06* (2013.01); *B64D 13/08* (2013.01); *B64D 27/10* (2013.01); *B64D 33/08* (2013.01); *F01D 25/14* (2013.01); *F02C 7/18* (2013.01); *F02C 7/277* (2013.01); *F04D 27/009* (2013.01); *F04D 29/321* (2013.01); *F04D 29/522* (2013.01); *B64D 2013/0618* (2013.01); *F05B 2220/303* (2013.01); *F05D 2260/205* (2013.01)

(58) Field of Classification Search
CPC ...... B64D 2013/0213; B64D 2013/063; B64D 2013/0603; B64D 2033/0213
See application file for complete search history.

(56) References Cited

U.S. PATENT DOCUMENTS

| | | | | |
|---|---|---|---|---|
| 5,136,837 A | * | 8/1992 | Davison | ............... F02C 6/08 60/39.183 |
| 7,021,519 B2 | * | 4/2006 | Foster | ............... B23K 20/129 228/112.1 |

(Continued)

FOREIGN PATENT DOCUMENTS

JP    2013204545    10/2013

OTHER PUBLICATIONS

EP Search Report dated Oct. 26, 2017 in EP Application No. 117175821.2.

*Primary Examiner* — Jason D Shanske
*Assistant Examiner* — Jason G Davis
(74) *Attorney, Agent, or Firm* — Snell & Wilmer, L.L.P.

(57) ABSTRACT

Systems and methods for cooling a core flow-path of a compressor section of a gas turbine engine are provided. In various embodiments, a cooling system for a gas turbine engine may comprise a valve system located radially outward from an engine case, the valve system being coupled between an air duct and the engine case, the valve system having an actuation device configured to at least one of open or close a valve in response to a command from an electronic engine controller, wherein cooling air from the air duct can pass through the valve system and enter the engine case into a high pressure compressor plenum when the valve system is in an open position.

11 Claims, 4 Drawing Sheets

(51) Int. Cl.
  *B64D 33/08*   (2006.01)
  *B64D 27/10*   (2006.01)
  *B64D 13/06*   (2006.01)
  *F02C 7/277*   (2006.01)

(56) References Cited

U.S. PATENT DOCUMENTS

| | | | | |
|---|---|---|---|---|
| 8,286,661 | B2* | 10/2012 | Krake | F16K 31/1245 |
| | | | | 137/487 |
| 9,388,744 | B2* | 7/2016 | Mathews, Jr. | F02C 9/00 |
| 9,822,662 | B2* | 11/2017 | Marsh | F01D 25/12 |
| 2008/0310949 | A1 | 12/2008 | Kondo | |
| 2013/0174574 | A1 | 7/2013 | Heaton | |
| 2014/0366965 | A1* | 12/2014 | Simpson | B64D 13/04 |
| | | | | 137/500 |
| 2017/0191419 | A1* | 7/2017 | Bayraktar | F02C 7/18 |

* cited by examiner

ACTIVE CORE COOLING SYSTEM

FIELD

The present disclosure relates to systems and methods for engine cooling, and, more specifically, to systems and methods for cooling the high pressure compressor of a gas turbine engine.

BACKGROUND

A gas turbine engine may include a compressor section, among other sections. During operation, the compressor section temperatures may increase. Gas turbine engines may undergo extended idle run times following engine operation to stabilize high pressure compressor (HPC) temperatures and to prevent excessive thermal gradients.

SUMMARY

The present disclosure is related to systems and methods for engine core cooling. A cooling system for a gas turbine engine may comprise a valve system located radially outward from an engine case, the valve system being coupled between an air duct and the engine case, the valve system having an actuation device configured to at least one of open or close a valve in response to a command from an electronic engine controller, wherein cooling air from the air duct can pass through the valve system and enter the engine case into a high pressure compressor plenum when the valve system is in an open position.

In various embodiments, the cooling air may enter a core flow-path of the gas turbine engine. The cooling system may be for cooling a high pressure compressor section of the gas turbine engine. The cooling air may be for cooling a rotor located in the high pressure compressor section. The cooling system may be for cooling in response to the gas turbine engine being powered down. The cooling air may be supplied via at least one of an auxiliary power unit and a ground cart air-supply. The air duct may comprise an aircraft environmental control system (ECS). The valve may be actuated using a pressure of the cooling air located upstream from the valve system.

A gas turbine engine may comprise an engine case, a compressor section, an engine starter air duct, and a valve system including an inlet and an outlet, the inlet being coupled directly to the engine starter air duct, the outlet being coupled to the engine case, wherein when the valve system is in an open position cooling air can enter the inlet from the engine starter air duct and exit the outlet into the compressor section.

In various embodiments, the inlet may be in fluid communication with the engine starter air duct. The outlet may be in fluid communication with the engine case. The gas turbine engine may further comprise an environmental control system (ECS) duct, the outlet being in fluid communication with the engine case via the ECS duct. The gas turbine engine may further comprise an electronic engine controller (EEC) in electronic communication with the valve system, the valve system being monitored by the EEC. The gas turbine engine may further comprise a bleed air monitoring computer (BMC) in electronic communication with the valve system, the valve system being controllable via the BMC. the inlet may be coupled to the engine starter air duct at location upstream of a starter air valve system.

A method for cooling a core flow-path of a compressor section of a gas turbine engine may comprise coupling an inlet of a valve system to an engine starter air duct, the inlet being in fluid communication with the engine starter air duct, and coupling an outlet of the valve system to a high pressure compressor (HPC) plenum, the outlet being in fluid communication with the HPC plenum, wherein the core flow-path can receive a cooling air from the engine starter air duct via the valve system when the valve system is in an open position.

In various embodiments, at least one of the coupling the inlet of the valve system to the engine starter air duct and coupling the outlet of the valve system to the HPC plenum may include welding. The coupling the outlet of the valve system to the HPC plenum may include attaching the outlet to an engine case. The coupling the outlet of the valve system to the HPC plenum may include attaching the outlet to an environmental control system (ECS) duct, the ECS duct being in fluid communication with the HPC plenum. The engine starter air duct may be capable of receiving cooling air via at least one of an auxiliary power unit and a ground cart air-supply.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein, "gas" and "air" may be used interchangeably.

Various components included in a high pressure compressor (HPC), including the rotor and case may cool down at different rates, leading to unequal thermal expansion which may physically deform the system. Such thermal inequality may lead to bowed rotors which can cause deflection of the HPC rotor. Starting the engine in this condition can lead to tip strike of the HPC blades against blade outer air seals (BOAS). Cooling systems, as provided herein, may aid in more uniform cooling of gas turbine engine components and may reduce engine maintenance time.

Figure 2:
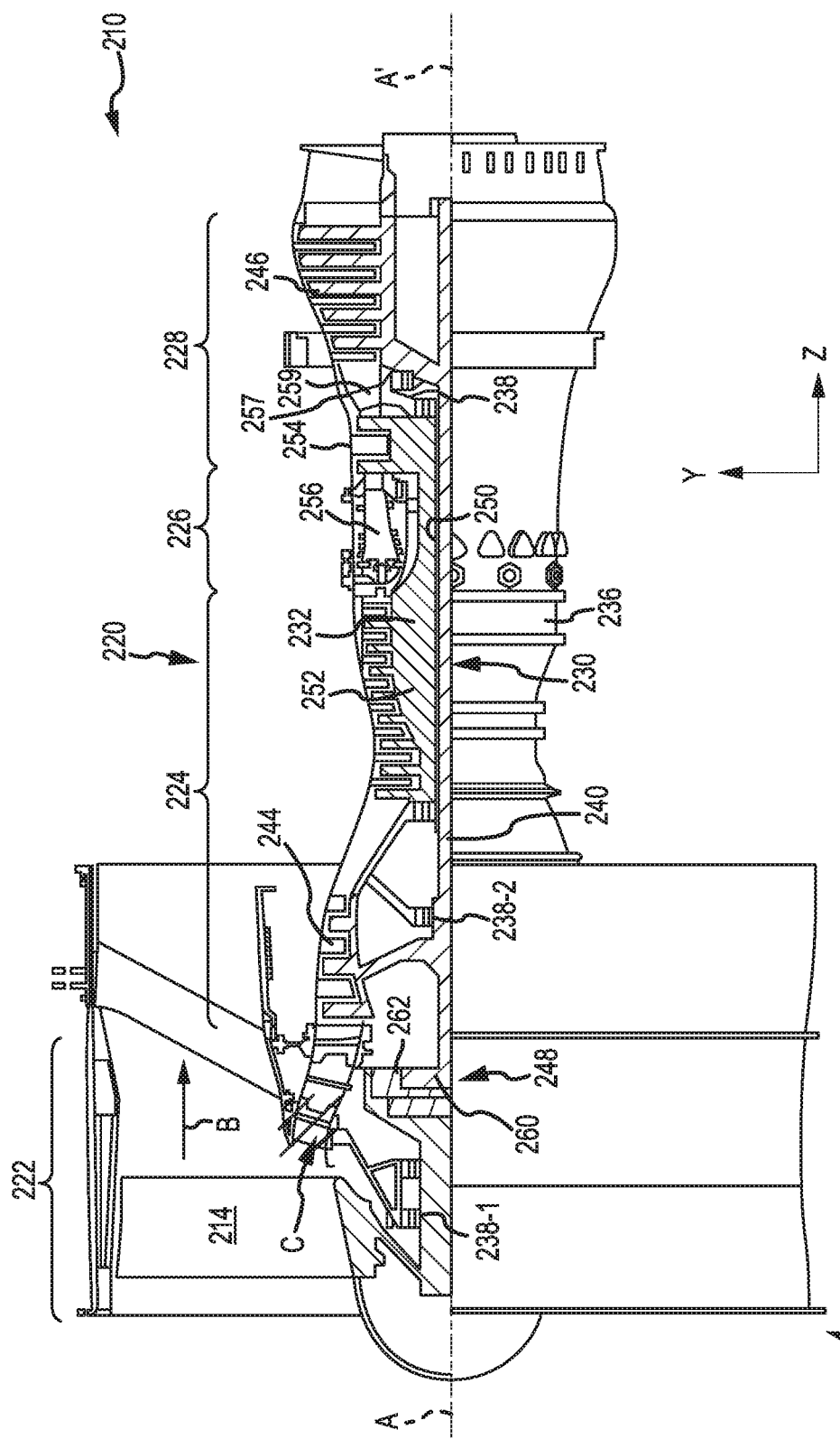
FIG. 2 illustrates a partial cross-section view of a gas turbine engine, in accordance with various embodiments.

In various embodiments and with reference to FIG. 2, a gas turbine engine 210 is provided. Gas turbine engine 210 may be a two-spool turbofan that generally incorporates a fan section 222, a compressor section 224, a combustor section 226 and a turbine section 228. Alternative engines may include, for example, an augmentor section among other systems or features. In operation, fan section 222 can drive air along a bypass flow-path B while compressor section 224 can drive air along a core flow-path C for compression and communication into combustor section 226 then expansion through turbine section 228. Although depicted as a turbofan gas turbine engine 210 herein, it should be understood that the concepts described herein are not limited to use with two-spool turbofans as the teachings may be applied to other types of turbine engines including three-spool architectures.

Gas turbine engine 210 may generally comprise a low speed spool 230 and a high speed spool 232 mounted for rotation about an engine central longitudinal axis A-A' relative to an engine static structure 236 via one or more bearing systems 238 (shown as bearing system 238-1 and bearing system 238-2 in FIG. 2). It should be understood that various bearing systems 238 at various locations may alternatively or additionally be provided including, for example, bearing system 238, bearing system 238-1, and bearing system 238-2.

Low speed spool 230 may generally comprise an inner shaft 240 that interconnects a fan 214, a low pressure (or first) compressor section 244 and a low pressure (or first) turbine section 246. Inner shaft 240 may be connected to fan 214 through a geared architecture 248 that can drive fan 214 at a lower speed than low speed spool 230. Geared architecture 248 may comprise a gear assembly 260 enclosed within a gear housing 262. Gear assembly 260 couples inner shaft 240 to a rotating fan structure. High speed spool 232 may comprise an outer shaft 250 that interconnects a high-pressure compressor ("HPC") 252 (e.g., a second compressor section) and high pressure (or second) turbine section 254. A combustor 256 may be located between HPC 252 and high pressure turbine 254. A mid-turbine frame 257 of engine static structure 236 may be located generally between high pressure turbine 254 and low pressure turbine 246. Mid-turbine frame 257 may support one or more bearing systems 238 in turbine section 228. Inner shaft 240 and outer shaft 250 may be concentric and rotate via bearing systems 238 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 244 and HPC 252, mixed and burned with fuel in combustor 256, then expanded over high pressure turbine 254 and low pressure turbine 246. Mid-turbine frame 257 includes airfoils 259 which are in the core airflow path. Low pressure turbine 246 and high pressure turbine 254 rotationally drive, respectively, low speed spool 230 and high speed spool 232 in response to the expansion.

Gas turbine engine 210 may be, for example, a high-bypass geared aircraft engine.

Figure 3:
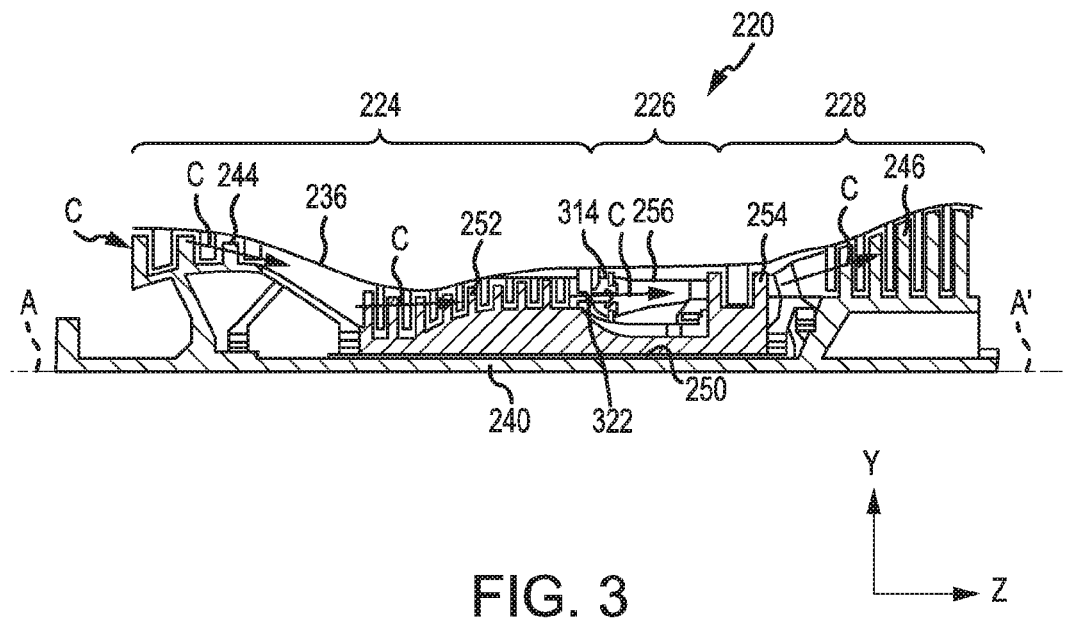
FIG. 3 illustrates a core flow-path in a core engine, in accordance with various embodiments.

In various embodiments, the bypass ratio of gas turbine engine 210 may be greater than about six (6). In various embodiments, the bypass ratio of gas turbine engine 210 may be greater than ten (10). In various embodiments, geared architecture 248 may be an epicyclic gear train, such as a star gear system (sun gear in meshing engagement with a plurality of star gears supported by a carrier and in meshing engagement with a ring gear) or other gear system. Geared architecture 248 may have a gear reduction ratio of greater than about 2.3 and low pressure turbine 246 may have a pressure ratio that is greater than about 5. In various embodiments, the bypass ratio of gas turbine engine 210 is greater than about ten (10:1). In various embodiments, the diameter of fan 214 may be significantly larger than that of the low pressure compressor 244, and the low pressure turbine 246 may have a pressure ratio that is greater than about 5:1. The pressure ratio of low pressure turbine 246 may be measured prior to inlet of the low pressure turbine 246 as related to the pressure at the outlet of low pressure turbine 246 prior to an exhaust nozzle. It should be understood, however, that the above parameters are exemplary of various embodiments of a suitable geared architecture engine and that the present disclosure contemplates other gas turbine engines including direct drive turbofans. FIG. 2 and FIG. 3 provide a general understanding of the sections in a gas turbine engine, and are not intended to limit the disclosure. The present disclosure may extend to all types of turbine engines, including turbofan gas turbine engines and turbojet engines, for all types of applications.

With respect to FIG. 3, elements with like element numbering as depicted in FIG. 2 are intended to be the same and will not necessarily be repeated for the sake of clarity.

FIG. 3 illustrates the primary flow gas path through core engine 220, in accordance with various embodiments. Core engine 220 may include engine static structure 236, low-pressure compressor 244, HPC 252, combustor 256, high-pressure turbine 254, and low-pressure turbine C. Engine static structure 236 may be referred to as an engine case. Gas may flow into low-pressure compressor 244 along core flow-path C. Gas flowing through low-pressure compressor 244 along core flow-path C may be compressed, resulting in an increase in pressure and temperature relative to the pressure and temperature upon entering low-pressure compressor 244. Gas may flow into HPC 252 along core flow-path C. Gas flowing through HPC 252 along core flow-path C may be compressed, resulting in an increase in pressure and temperature relative to the pressure and temperature upon entering HPC 252. Uncombusted gas in core flow-path C leaving HPC 252 may be referred to as T3 gas 322. T3 gas may have a varying temperature at different engine speeds. The temperature of T3 gas may be about 400° F. (205° C.) when core engine 220 is at idle speeds and may reach about 1,400° F. (760° C.) or higher as core engine 220 accelerates for takeoff, where the term "about" in this context only may refer to +/−200° F. Different engines may have higher temperatures or lower temperatures at each stage. T3 gas may be present at location 314 of core engine

220. T3 gas leaving the HPC 252 may then flow into combustor 256 to supply combustor 256 with air for combustion.

Figure 1:
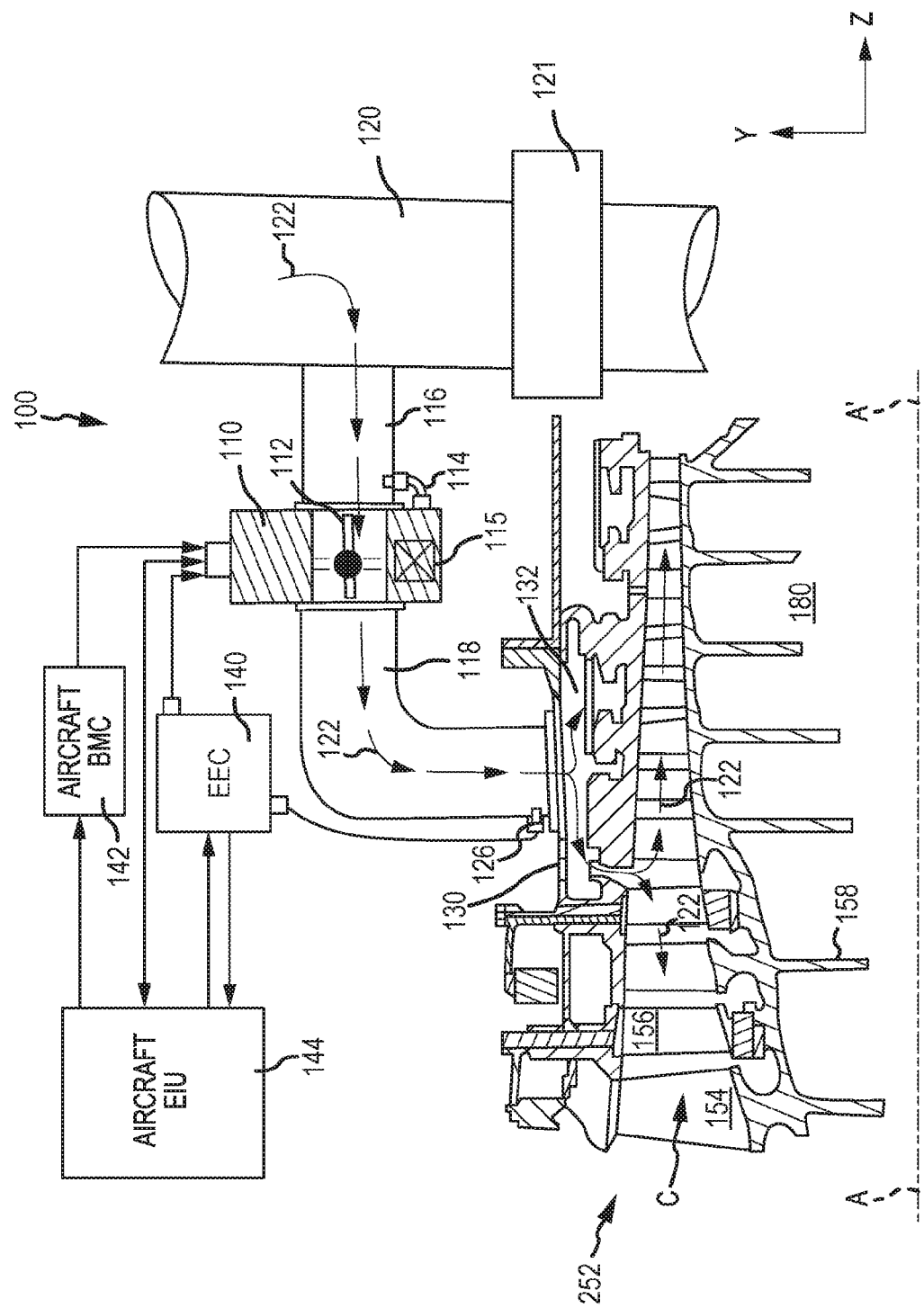
FIG. 1 illustrates a schematic view of a cooling system having a valve system outlet coupled directly to an engine case, in accordance with various embodiments.

With respect to FIG. 1, elements with like element numbering as depicted in FIG. 2 and FIG. 3 are intended to be the same and will not necessarily be repeated for the sake of clarity.

With reference to FIG. 1, an active core cooling system (hereinafter referred to as "cooling system") 100 is illustrated, in accordance with various embodiments. Cooling system 100 may include a valve system 110. Valve system 110 may include a valve, such as butterfly valve 112 for example, and an actuation device, such as actuation device 115 for example. Actuation device 115 may include a muscle pressure line 114. However, any suitable valve system having a valve and an actuation device for actuating the valve between an open and closed position is contemplated herein. Valve system 110 may be fluidly coupled to an air duct 120 via an inlet 116. In various embodiments, air duct 120 may comprise an engine starter air duct. Valve system 110 may be fluidly coupled to an engine case 130 via an outlet 118. In various embodiments, engine case 130 may comprise a high pressure compressor (HPC) case. Valve system 110 may be located radially outward (y-direction) from engine case 130. Inlet 116 and outlet 118 may comprise a pipe, tube, or any other suitable duct. In various embodiments, inlet 116 and outlet 118 may comprise carbon steel, stainless steel, beryllium copper, an austenitic nickel-chromium-based super alloy, a titanium alloy, or any other material suitable for high temperatures.

In various embodiments, cooling air 122 may be supplied via an aircraft auxiliary power unit (APU). In various embodiments, cooling air 122 may be supplied via a ground cart air-supply. Cooling air 122 may enter plenum 132 in response to valve system 110 actuating to an open position. In various embodiments, plenum 132 may comprise an HPC bleed air plenum. Cooling air 122 may then enter core flow-path C. Cooling air 122 may travel in a forward direction (negative z-direction) in core flow-path C. Cooling air 122 may travel in an aft direction (positive z-direction) in core flow-path C. Cooling air 122 may also enter bore 180. In this regard, cooling air 122 may aid in evenly cooling HPC 252. In this regard, cooling air 122 may aid in evenly cooling components around core flow-path C. Components that may be cooled include blades, vanes (i.e., blade 154 or vane 156) and rotor 158 of HPC 252, as well as any other components located within HPC 252. In this regard, inlet 116 is in fluid communication with air duct 120. Furthermore, in this regard, outlet 118 is in fluid communication with engine case 130, plenum 132, and core flow-path C. Still furthermore, valve system 110 is in fluid communication with inlet 116 and outlet 118.

In various embodiments, cooling system 100 may be for cooling HPC 252 in response to the gas turbine engine being powered down. For example, after a gas turbine engine operates, the HPC 252 may be hot, such as between about 400° F. (205° C.) and about 1,400° F. (760° C.), for example. Thus, after turning off the gas turbine engine, cooling system 100 may be operated in order to evenly cool down HPC 252 and core flow-path C.

In various embodiments, valve system 110 may comprise a butterfly valve 112. In various embodiments, valve system 110 may include a muscle pressure line 114. Air from inlet 116 may be communicated into valve system 110 via muscle pressure line 114 to actuate butterfly valve 112. Thus, valve system 110 may be actuated using a pressure of the cooling air 122 located upstream from the valve. Air duct 120 may include a starter air valve 121. Valve system 110 may be coupled to air duct 120 at a location upstream from starter air valve 121.

In various embodiments, an electronic engine controller (EEC) 140 may be in electronic communication with valve system 110. EEC 140 may be configured to monitor valve system 110. Thus, EEC 140 may determine if valve system 110 is in an open position, a closed position, or any other position. EEC 140 may be in electronic communication with engine interface unit (EIU) 144. In various embodiments, EIU 144 may control valve system 110. In various embodiments, EIU may control valve system 110 via EEC 140.

In various embodiments, a bleed air monitoring computer (BMC) 142 may be in electronic communication with valve system 110. EIU 144 may be in electronic communication with BMC 142. BMC 142 may be configured to control valve system 110 in response to EEC 140 being powered off. EIU 144 may receive valve position feedback from valve system 110.

In general, aircraft EEC's lose power upon engine shutdown. Thus, it may be necessary for valve system 110 to be controlled via a system other than the EEC. In this regard, EIU 144 may be in direct electronic communication with valve system 110 as illustrated, in accordance with various embodiments. Furthermore, EIU 144 may be in electronic communication with valve system 110 via BMC 142, in accordance with various embodiments. Although illustrated as being in electronic communication with all three of EIU 144, BMC 142, and EEC 140, it is contemplated herein that valve system 110 may be in electronic communication with any one of, or a combination of, EIU 144, BMC 142, and/or EEC 140. Furthermore, it is contemplated herein that EEC 140 may be configured to remain powered on after an engine shutdown. Thus, EEC 140 may be used to control valve system 110 after an engine shutdown, in accordance with various embodiments.

In various embodiments, a temperature sensor 126 may be coupled to outlet 118.

Temperature sensor 126 may monitor the temperature of cooling air 122. Temperature sensor 126 may monitor the temperature of outlet 118. Although shown as being coupled to outlet 118, it is contemplated herein that temperature sensor 126 may be coupled to engine case 130. Thus, temperature sensor 126 may be configured to monitor the temperature of engine case 130 and/or plenum 132. Temperature sensor 126 may send a signal to EEC 140 corresponding to the measured temperature. Cooling system 100 may use said signal from temperature sensor 126 to control cooling system 100.

Figure 4:
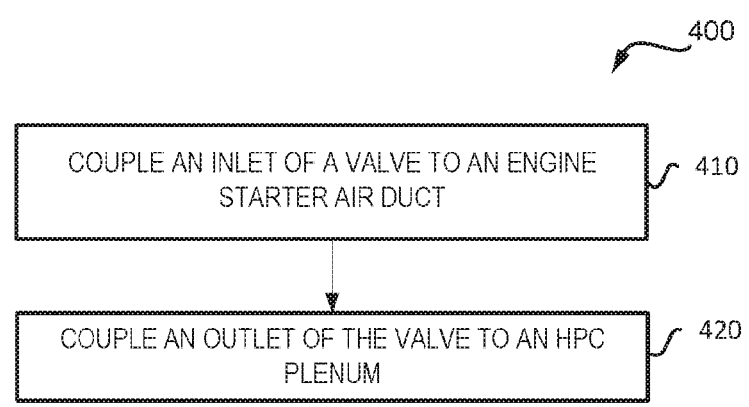
FIG. 4 a method for cooling a core flow-path of a compressor section of a gas turbine engine, in accordance with various embodiments.

With reference to FIG. 4, a method 400 for cooling a core flow-path of a compressor section of a gas turbine engine is provided. Method 400 may include coupling an inlet of a valve to an engine starter air duct (see step 410). Method 400 may include coupling an outlet of the valve to a high pressure compressor (HPC) plenum (see step 420).

In various embodiments, with additional reference to FIG. 1, step 410 may include coupling inlet 116 of valve system 110 to air duct 120, the inlet 116 being in fluid communication with air duct 120. Step 420 may include coupling outlet 118 of valve system 110 to an HPC plenum 132, the outlet 118 being in fluid communication with the plenum 132. Core flow-path C may receive cooling air 122 from the air duct 120 via valve system 110 in response to the valve system 110 being actuated to an open position. In various embodiments, the inlet 116 may be welded to air duct 120.

In various embodiments, as previously mentioned, valve system 110 may comprise an actuation device 115 that acts to open and close valve system 110. For example, actuation device 115 may actuate butterfly valve 112 via muscle pressure line 114 in response to a command received from EEC 140, EIU 144, and/or BMC 142. In various embodiments, valve system 110 may include a spring which acts to close butterfly valve 112 in response to valve system 110 losing power.

Figure 5:
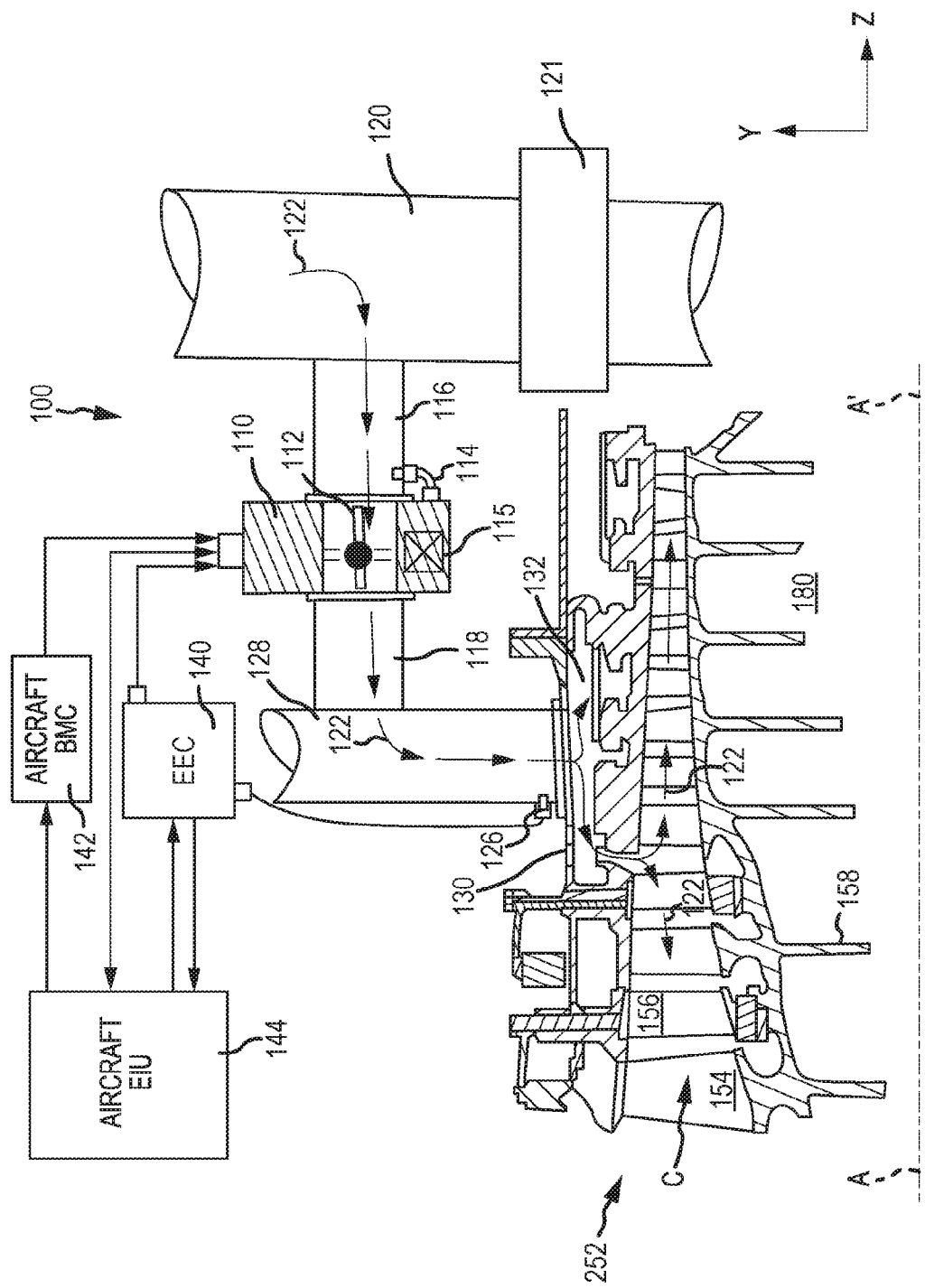
FIG. 5 a schematic view of a cooling system having a valve system outlet coupled to an environmental control system (ECS) duct, in accordance with various embodiments.

With respect to FIG. 5, elements with like element numbering as depicted in FIG. 1 are intended to be the same and will not necessarily be repeated for the sake of clarity.

With reference to FIG. 5, cooling system 100 is illustrated, in accordance with various embodiments. Although FIG. 1 illustrates outlet 118 being coupled directly to engine case 130, outlet 118 may be coupled to engine case 130 via environmental control system (ECS) duct 128. ECS duct 128 may comprise a high pressure duct. Thus, outlet 118 may be coupled to ECS duct 128. ECS duct 128 may comprise a duct for communicating compressor bleed air to other aircraft systems for environmental control of the aircraft. In various embodiments, outlet 118 may be welded to ECS duct 128. In this regard, ECS duct 128 is in fluid communication with plenum 132.

Benefits, other advantages, and solutions to problems have been described herein with regard to specific embodiments. Connecting lines shown in the various figures contained herein are intended to represent exemplary functional relationships and/or physical couplings between the various elements. It should be noted that many alternative or additional functional relationships or physical connections may be present in a practical system. In the appended claims, a reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

When a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke the provisions of 35 U.S.C. 112(f), unless the element is expressly recited using the phrase "means for."

What is claimed is:

1. A cooling system for a gas turbine engine comprising:
an electronic engine controller;
an aircraft engine interface unit in electronic communication with the electronic engine controller; and
a valve system located radially outward from an engine case, the valve system being coupled between an engine starter air duct and the engine case,
the valve system coupled to the engine starter air duct, the valve system is coupled to the engine starter air duct upstream from a starter air valve for the engine starter air duct, the valve system receives a cooling air from the engine starter air duct,
the valve system having an actuation device including a muscle pressure line, the muscle pressure line communicates the cooling air into the valve system and the valve system is actuated via the actuation device using a pressure of the cooling air at an upstream side of the valve system, the actuation device configured to at least one of open or close a butterfly valve in response to a command from at least one of the electronic engine controller and the aircraft engine interface unit,
wherein the cooling air exits the valve system and enters the engine case into a high pressure compressor plenum and a core flow-path of the gas turbine engine when the valve system is in an open position,
the valve system is in electronic communication with the electronic engine controller and the aircraft engine interface unit, and
the valve system is independent from an environmental control system (ECS).

2. The cooling system of claim 1, wherein the cooling system is for cooling a high pressure compressor section of the gas turbine engine.

3. The cooling system of claim 2, wherein the cooling air is for cooling a rotor located in the high pressure compressor section.

4. The cooling system of claim 1, wherein the cooling system is for cooling in response to the gas turbine engine being powered down.

5. A gas turbine engine comprising:
an electronic engine controller;
an aircraft engine interface unit in electronic communication with the electronic engine controller;
an engine case;
a compressor section;
an engine starter air duct;
a core flow-path; and
a valve system including an inlet and an outlet, the inlet being coupled directly to the engine starter air duct, the outlet being coupled to the engine case,
the valve system coupled to the engine starter air duct, the valve system is coupled to the engine starter air duct upstream from a starter air valve for the engine starter air duct, the valve system receives a cooling air from the engine starter air duct,
wherein the valve system is in electronic communication with the electronic engine controller, the valve system having an actuation device including a muscle pressure line, the muscle pressure line communicates the cooling air into the valve system and the valve system is actuated via the actuation device using a pressure of the cooling air at an upstream side of the valve system, the actuation device configured to at least one of open or close a butterfly valve via the muscle pressure line in response to a command from an at least one of the electronic engine controller and the aircraft engine interface unit,
cooling air enters the inlet from the engine starter air duct, and exits the outlet into the compressor section and enters the core flow-path in response to the valve system being in an open position, and
the valve system is independent from an environmental control system (ECS).

6. The gas turbine engine of claim 5, wherein the valve system is monitored by the electronic engine controller.

7. The gas turbine engine of claim 6, further comprising a bleed air monitoring computer (BMC) in electronic communication with the valve system, the valve system being controllable via the BMC.

8. A method for cooling a core flow-path of a compressor section of a gas turbine engine comprising:

coupling an inlet of a valve system to an engine starter air duct, the inlet being in fluid communication with the engine starter air duct and the inlet coupled to the engine starter air duct upstream from a starter air valve for the starter air duct;

coupling an outlet of the valve system to a high pressure compressor (HPC) plenum, the outlet being in fluid communication with the HPC plenum, the valve system receives a cooling air from the engine starter air duct; and coupling the valve system to an electronic engine controller, the valve system having an actuation device including a muscle pressure line, the muscle pressure line communicates the cooling air into the valve system and the valve system is actuated via the actuation device using a pressure of the cooling air at an upstream side of the valve system, the actuation device configured to at least one of open or close a butterfly valve in response to a command from at least one of the electronic engine controller and an aircraft engine interface unit, wherein the core flow-path can receive a cooling air from the engine starter air duct via the valve system and the HPC plenum when the valve system is in an open position, and the valve system is independent from an environmental control system (ECS).

9. The method of claim 8, wherein at least one of the coupling the inlet of the valve system to the engine starter air duct and coupling the outlet of the valve system to the HPC plenum includes welding.

10. The method of claim 8, wherein the coupling the outlet of the valve system to the HPC plenum includes attaching the outlet to an engine case.

11. The method of claim 8, wherein the coupling the outlet of the valve system to the HPC plenum includes attaching the outlet to an ECS duct, the ECS duct being in fluid communication with the HPC plenum.

* * * * *